Patented May 25, 1948

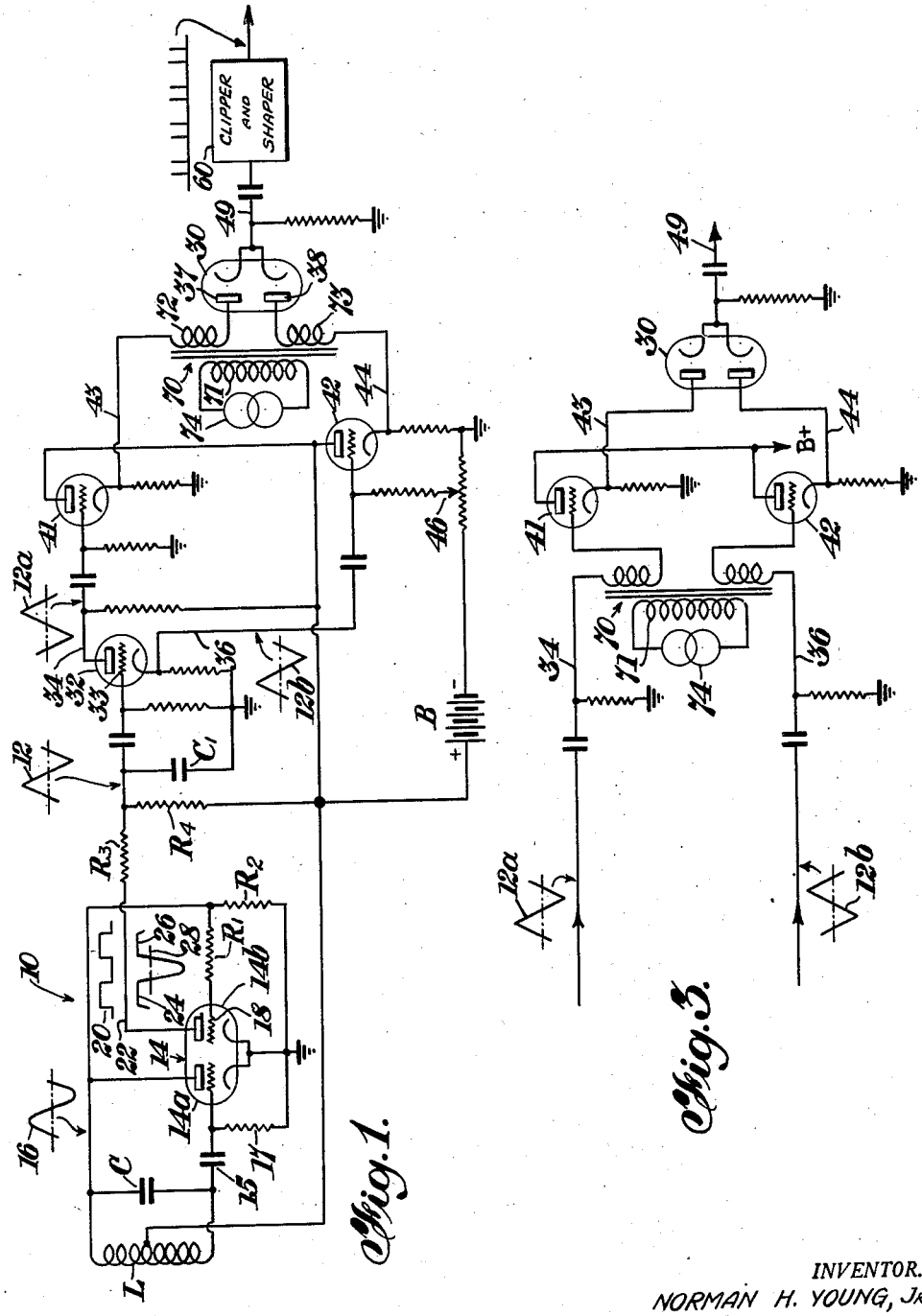

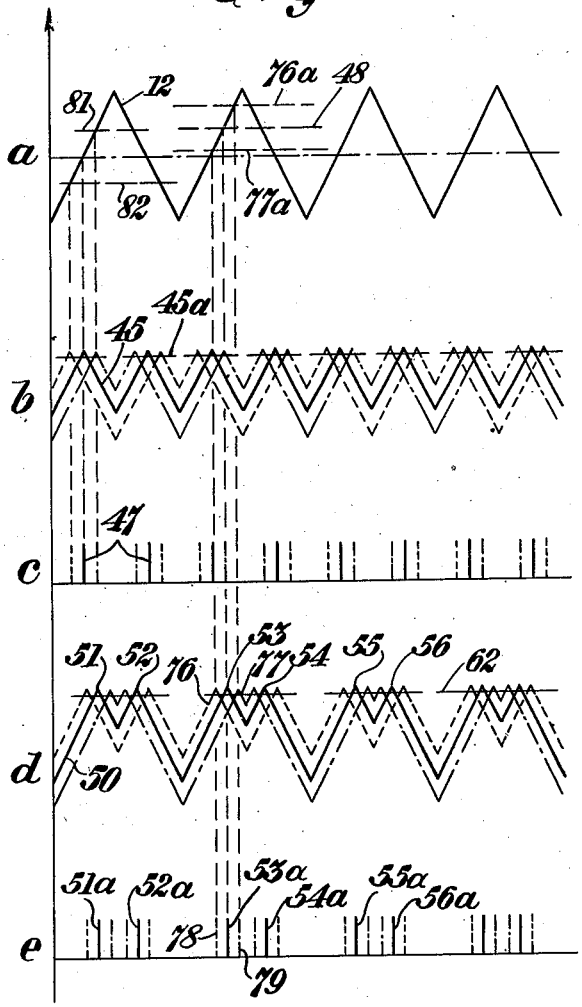

2,441,983

UNITED STATES PATENT OFFICE 2,441,983

MODULATOR

Norman H. Young, Jr., Jackson Heights, N. Y., assignor to Federal Telephone and Radio Corporation, New York, N. Y., a corporation of Delaware Application December 6, 1943, Serial No. 513,074

13 Claims. (Cl. 179—171.5)

This invention relates to modulation systems and more particularly to a modulator for generating pulses time modulated according to a signal wave.

In the copending application of E. Labin and D. D. Grieg, Serial No. 455,897, filed August 24, 1942, a push-pull T. M. (time modulation) system is disclosed incorporating the principle of full-wave rectification of a sine or triangular wave whereby spaced cusps are produced and time modulated in push-pull manner according to signal energy. The cusps are clipped and, if desired, may be shaped to produce narrow width pulses for transmission.

It is one of the objects of my invention to provide a further time modulation system particularly adapted for use with triangular base waves or other shaped waves having long substantially linearly inclined portions wherein it is important to preserve such wave shape prior to rectification.

Another object of my invention is to provide a time modulation system capable of greater swings of modulation with substantially linear translation of the signal energy into time displacement of the output pulses than possible by time modulators heretofore proposed.

The above and other objects ancillary thereto will become more apparent upon consideration of the detailed description to be read in connection with the accompanying drawings, in which:

Fig. 1 is a schematic wiring diagram of a time modulation system according to my invention;

Fig. 2 is a graphical illustration useful in explaining the operation of the system of Fig. 1; and Fig. 3 is a schematic wiring diagram illustrating a further embodiment of the invention.

Referring to Figs. 1 and 2 of the drawing, a circuit 10 is shown for producing a triangular wave 12, curve $a$, of stable frequency. The circuit 10 includes a double triode vacuum tube 14 the left hand section 14a of which is included with circuit elements L, C, 15, 17 and B to constitute a well-known form of oscillator for producing a stable sinusoidal wave 16. The right hand section 14b includes a grid 18 to which is connected a resistor network $R_1$, $R_2$ whereby the sinusoidal wave 16 is translated into a substantially rectangular output wave 20 in the plate circuit 22. The wave form appearing on the grid of tube 14b is indicated at 24, the tube operating between a saturation level 26 and cut-off level 28. The flat portion 26 is caused by grid current flowing through the high resistance $R_1$. The rectangular output wave 20 is applied to a resistance-capacitance circuit $R_3$, $R_4$ and $C_1$. The action of the high resistances $R_3$ and $R_4$ in connection with capacitance $C_1$, which is also fairly large, causes a triangular wave 12 to appear across the capacitance $C_1$.

In order to apply the triangular wave in push-pull across the double diode rectifier tube 30 without adversely affecting the triangular shape of the wave prior to rectification, I provide a coupling tube 32 having an input grid 33 to which the voltage wave 12 is applied. The tube 32 includes a plate circuit 34 and a cathode follower circuit 36 which form two branches 34, 41, 43, 72 and 36, 42, 44, 73 of a parallel circuit to the plates 37 and 38 of the double diode tube 30. The phase of the wave 12 is inverted in the plate circuit 34 as indicated at 12a but is the same in cathode circuit 36 as indicated at 12b. These two waves are then applied to the grids of amplifier tubes 41 and 42, respectively. These tubes are each provided with cathode follower output connections 43 and 44, respectively, the connection 43 being connected with plate 37 and the connection 44 being connected with plate 38 of the rectifier tube 30.

During normal rectifying operation, the input wave 12 will be fully rectified producing a similar triangular wave 45, curve $b$, the frequency of which is double the frequency of wave 12. This symmetrical rectification may be used for time modulation to produce symmetrically timed pulses 47, curve $c$, such as obtained by clipping at level 45a, curve $b$, but preferably the rectification is given a predetermined off-set biasing condition. This is accomplished by providing the grid of one of the amplifier tubes such as tube 42 with a given bias as determined by the adjustment of the potentiometer contact 46. This, in effect, off-sets the zero axis of the wave 12 for full-wave rectification of the wave. For example, the off-set axis produced by this predetermined bias on tube 42 is indicated by the broken line 48. The rectification according to the off-set axis 48 produces a combined wave output at 49 illustrated in solid lines 50 in curve $d$. It will be observed that the portions of the wave 12 above the axis 48 are smaller than the portions below the axis 48. This produces spaced peaks 51, 52; 53, 54; 55, 56; etc., which are grouped in pairs according to the amount of off-set bias. The spacing between peaks 51 and 52, for example, is less than the spacing between the trailing peak of one pair and the leading peak of the next succeeding pair, such as spacing between peaks 52 and 53.

A known clipper and shaper circuit 60 may be provided to clip the peaks along a level 62, and by an amplifying and shaping operation produce narrow width impulses 51a, 52a, etc. It will be noted that the impulses of curve e have the same timing as the peaks formed by the solid line 50 in curve d.

Time modulation of the impulses of curve e according to a signal wave is effected by means of a transformer 70. The transformer includes a primary coil 71 and two secondary coils 72 and 73. The primary coil 71 is coupled to a source of signal energy 74 which may comprise a microphone together with audio amplifier stages, etc. The branch circuits 43 and 44 each include one of the secondary coils so that a signal wave applied across the primary 71 operates to amplitude modulate the triangular wave energy conveyed in push-pull manner by circuits 43 and 44.

Curve d of Fig. 2 illustrates the push-pull operation of the modulating signal. Assuming that the modulation varies the amplitude of the triangular wave energy with respect to the axis 48 or vice versa, the off-set axis 48 varies with respect to the wave 12, curve a, the combined output wave 50 of the rectifier tube 30 will shift in time between the wave limit positions 76 and 77. Wave position 76, for example, may be regarded as representing the positive polarity limit 76a and wave position 77 as representing the negative polarity limit 77a. It will be understood, of course, that the peaks 51 and 52 will be displaced toward or away from each other according to changes in amplitude of the signal wave. Thus, the pulses of curve e vary in time displacement within the limits indicated by the broken lines 78 and 79 depending upon the corresponding instantaneous amplitude of the signal wave.

For time modulation of the symmetrically timed pulses 47 of curve c, the push-pull modulation occurs between limits symmetrically spaced on opposite sides of the zero axis. As regards the off-set biasing rectification, it is preferable to have the lower limit at or above the zero axis, although a negative polarity limit may be desired in some systems.

From the foregoing description it is clear that the wave energy 12 in its push-pull application to the rectifier tube 30 is not altered as it would be were it applied through a transformer, that is, from the primary to the secondary coils. The straight line sides of the triangular wave are thus preserved so that the modulating wave may be caused to produce wide swings on the rectifying operation of the wave without introducing distortion as may be the case of a sinusoidal base wave for corresponding wide swings of modulation. It will be understood, however, that other shaped waves may be used as the base wave if desired. In fact, a sinusoidal wave may be applied to the grid 33 of the coupling tube 32 in the same manner, the only precaution required being that the modulating swing be limited to the relatively short portion of the sinusoidal wave adjacent the zero axis thereof, which is approximately linear.

In Fig. 3 I have shown substantially the same circuit arrangement with the exception that the transformer 70 is provided in the grid circuit of the tubes 41 and 42 instead of the cathode circuits 43 and 44. In this embodiment the wave energies of the branch circuits 34 and 36 are push-pull modulated according to the signal wave prior to amplification by tubes 41 and 42. This may be desirable so as to eliminate audio amplifiers in the primary circuit of the transformer 70.

The circuit of Fig. 3 is not provided with an off-set bias, so that the combined wave would resemble wave 45 of curve b. This circuit, however, may be biased similarly as indicated in Fig. 1 if desired. It will also be clear to those skilled in the art that the signal wave may be introduced in the parallel circuits by substituting multi-grid mixer tubes for tubes 41 and 42 with the signal wave fed to one of the grid circuits of one or both such tubes.

The double diode rectifier tube 30 may comprise separate diodes, and, if desired, may comprise dry rectifier elements or triodes wherein the input waves are applied to the grid thereof. It will also be understood that while I have shown a particular form of triangular voltage wave source, that other circuit arrangements for producing desired shaped waves may be substituted therefor.

While I have described above the principles of my invention as applied to certain specific apparatus, it will be evident that modifications of the specific arrangement and structure illustrated and described may be resorted to without departing from the spirit of the invention or the scope of the appended claims.

I claim:

1. A time modulation system comprising a voltage wave source for furnishing a wave having substantially linearly inclined portions, two rectifier means, circuit means for coupling said wave source in parallel circuit to said two rectifier means, said circuit means including a vacuum tube having a grid input circuit and plate and cathode output circuits forming the two legs of said parallel circuit, the plate and cathode circuits providing two output waves of opposite phase in response to an input wave on said grid circuit, means combining the outputs of said two rectifier means whereby a combined wave having spaced peaks is produced, a signal wave source, and means to amplitude modulate said two output waves in push-pull operation according to said signal wave, whereby the timing of said peaks is modulated according to variations in said signal wave.

2. The system defined in claim 1 wherein the circuit means includes two parallel branches each having an amplifier, and means to provide at least one of said amplifiers with a given offset bias.

3. The system defined in claim 1 wherein the means for amplitude modulating the two output waves includes a transformer having a primary coil and two secondary coils, means connecting the primary coil to said signal wave source, means connecting one of said secondary coils in one branch of the parallel circuit and means for connecting the other of said secondary coils in the other branch of said parallel circuit.

4. The system defined in claim 1 wherein the circuit means includes two parallel branches each having an amplifier, and the means for amplitude modulating the two output waves in push-pull operation is coupled to said circuit means ahead of said amplifiers.

5. The system defined in claim 1 wherein the circuit means includes two parallel branches each having an amplifier, and the means for amplitude modulating the two output waves in push-pull operation is coupled to said circuit means following said amplifiers.

6. The system defined in claim 1 in combination with means for transmitting only the peak portions of said combined wave.

7. The system defined in claim 1 wherein the voltage wave source includes a stable oscillator, means for translating the sinusoidal wave output of said oscillator into a substantially rectangular wave, and means to translate said rectangular wave into a triangular wave, having substantially the same slope for the leading and trailing edges of each undulation thereof.

8. A time modulation system comprising a voltage wave source for furnishing a wave having substantially linearly inclined portions, first and second wave transmission means, each of said transmission means having a threshold clipping level for passing energy according to those portions of the wave applied thereto which extends beyond the threshold clipping level thereof, circuit means for coupling said wave source in parallel circuit relation to said first and said second transmission means, said circuit means including a tube having a grid input circuit and plate and cathode output circuits, the plate and cathode circuits providing two output waves of opposite phase in response to an input wave on said grid circuit, each of said first and said second transmission means responding to those wave portions of said output waves which extend in proper polarity direction beyond the threshold level thereof, means for combining the outputs of said first and said second transmission means whereby a combined wave having sharp peaks is produced, a signal wave source, and means to vary the amplitude of said two output waves in push-pull operation with respect to said threshold levels according to amplitude variations in said signal wave.

9. In combination, means for generating a sawtooth signal, means for deriving paired phase displaced sawtooth signals from said sawtooth signal, a source of modulating signal, and means responsive to said source of modulating signal comprising rectifier means having a single ended output circuit for time modulating and combining the peaks of said phase displaced sawtooth signals.

10. In combination, a source of sawtooth waves, means for deriving from said sawtooth waves pairs of phase displaced sawtooth waves, means for differentially modulating said pairs of phase displaced sawtooth waves comprising a push-pull rectifier means having a single ended output circuit for combining said modulated waves.

11. In combination, a source of modulating signals, a source of phase opposed sawtooth signals, means responsive to said modulating signals for relatively time modulating said sawtooth signals and comprising a pair of rectifiers, means for applying successively timed sawtooth signal components to alternate ones of said pair of rectifiers, means for biasing said rectifiers in response to said modulating signals and means for combining said modulated sawtooth signals.

12. A combination in accordance with claim 11 wherein said modulating means are statically biased differentially.

13. The combination comprising two rectifier means, circuit means for coupling a voltage wave source in parallel circuit to said two rectifier means, said circuit means including a vacuum tube having a grid input circuit and plate and cathode output circuits, forming the two legs of said parallel circuit, the plate and cathode output circuits providing two output waves in opposite phase in response to an input wave on said grid circuit, means for combining the outputs of said two rectifiers means whereby a fully rectified wave is produced, means to modulate the operation of the rectifier means comprising a transformer having a primary coil and two secondary coils, a source of modulating voltage connected to said primary coil, one branch of the parallel circuit of said circuit means including one of said secondary coils and the other branch thereof including the other of said secondary coils.

NORMAN H. YOUNG, JR.

REFERENCES CITED

The following references are of record in the file of this patent:

UNITED STATES PATENTS

| Number | Name | Date |
|---|---|---|
| 2,061,734 | Kell | Nov. 24, 1936 |
| 2,086,918 | Luck | July 13, 1937 |
| 2,166,688 | Kell | July 18, 1939 |
| 2,226,459 | Bingley | Dec. 24, 1940 |